US012759489B2

(12) United States Patent
DiNardo et al.

(10) Patent No.: US 12,759,489 B2
(45) Date of Patent: Oct. 13, 2026

(54) SMART TRAILER POWER SUPPLY

(71) Applicant: Phillips Connect Technologies LLC, Santa Fe Springs, CA (US)

(72) Inventors: Gerard DiNardo, Santa Fe Springs, CA (US); Jim Epler, Irvine, CA (US); Clifford Creech, Lake Forest, CA (US)

(73) Assignee: Phillips Connect Technologies LLC, Santa Fe Springs, CA (US)

(*) Notice: Subject to any disclaimer, the term of this patent is extended or adjusted under 35 U.S.C. 154(b) by 0 days.

(21) Appl. No.: 19/195,366

(22) Filed: Apr. 30, 2025

(65) Prior Publication Data

US 2025/0256668 A1 Aug. 14, 2025

Related U.S. Application Data

(63) Continuation of application No. PCT/US2023/078729, filed on Nov. 3, 2023.

(60) Provisional application No. 63/382,183, filed on Nov. 3, 2022.

(51) Int. Cl.

| | |
|---|---|
| ***B60R 16/033*** | (2006.01) |
| ***B60C 23/00*** | (2006.01) |
| ***B60R 16/023*** | (2006.01) |
| ***B60T 8/17*** | (2006.01) |
| ***H02J 1/08*** | (2006.01) |
| *G07C 5/02* | (2006.01) |

(52) U.S. Cl.

CPC .......... *B60R 16/033* (2013.01); *B60C 23/009* (2013.01); *B60R 16/0238* (2013.01); *B60T 8/1708* (2013.01); *H02J 1/086* (2020.01); *G07C 5/02* (2013.01)

(58) Field of Classification Search

CPC . B60R 16/033; B60R 16/0238; B60C 23/009; B60T 8/1708; B60T 2270/406; B60T 8/885; H02J 1/086; G07C 5/02

USPC .................................................... 701/1, 32.8

See application file for complete search history.

(56) References Cited

U.S. PATENT DOCUMENTS

| | | | | |
|---|---|---|---|---|
| 5,739,592 | A * | 4/1998 | Rigsby | B60D 1/62 701/32.7 |
| 5,929,532 | A * | 7/1999 | Sell | B60T 17/18 307/118 |
| 6,120,052 | A * | 9/2000 | Capik | B60D 1/36 280/477 |
| 6,222,443 | B1 * | 4/2001 | Beeson | B60D 1/62 340/539.1 |
| 7,151,443 | B2 * | 12/2006 | Dialinakis | B60D 1/36 340/471 |
| 7,286,046 | B2 * | 10/2007 | Kinsey | B60Q 3/30 439/35 |
| 8,031,061 | B2 * | 10/2011 | Kalous | B60Q 1/305 340/425.5 |

(Continued)

FOREIGN PATENT DOCUMENTS

WO WO 2021165942 A1 8/2021

*Primary Examiner* — Jaime Figueroa

(74) *Attorney, Agent, or Firm* — Haynes and Boone, LLP

(57) ABSTRACT

A smart battery box is provided that includes a battery for selectively powering a trailer main harness coupled to an ABS controller. The smart battery box includes a controller configured to respond to a command to control a switch to close to power the ABS controller through the battery. In this fashion, the ABS controller may be tested through the smart battery box while the trailer is disconnected from a tractor.

20 Claims, 5 Drawing Sheets

(56) References Cited

U.S. PATENT DOCUMENTS

| | | | | |
|---|---|---|---|---|
| 8,704,650 | B1 | 4/2014 | Perten et al. | |
| 8,760,274 | B2 * | 6/2014 | Boling | G08G 1/20 340/933 |
| 10,173,486 | B1 * | 1/2019 | Lee | G08G 1/202 |
| 2003/0195668 | A1 * | 10/2003 | Radtke | H04B 3/548 701/1 |
| 2004/0224630 | A1 * | 11/2004 | MacFarland | H04L 67/12 455/11.1 |
| 2006/0267746 | A1 * | 11/2006 | Kinsey | B60Q 11/00 340/431 |
| 2007/0152502 | A1 | 7/2007 | Kinsey et al. | |
| 2014/0145837 | A1 * | 5/2014 | Douglas | B60Q 1/305 340/431 |
| 2016/0023587 | A1 * | 1/2016 | Bean | B60Q 1/305 340/431 |
| 2016/0129896 | A1 | 5/2016 | Tu et al. | |
| 2017/0063104 | A1 * | 3/2017 | Bean | H02J 7/90 |
| 2018/0099712 | A1 * | 4/2018 | Bean | G05B 19/4185 |
| 2019/0217831 | A1 * | 7/2019 | Viele | B60D 1/245 |
| 2020/0171900 | A1 * | 6/2020 | Pampattiwar | B60D 1/64 |

* cited by examiner

SMART TRAILER POWER SUPPLY

CROSS-REFERENCE TO RELATED APPLICATIONS

The present application is a continuation of International Patent Application No. PCT/US2023/078729, filed Nov. 3, 2023, which claims priority to and the benefit of U.S. Provisional Application No. 63/382,183, filed Nov. 3, 2022, each of which are hereby incorporated by reference herein in their entirety.

TECHNICAL FIELD

The present invention relates to a trailer power supply, and more particularly, to trailer power supply that may selectively power at least one of a sensor a main trailer harness, and a telematics gateway.

BACKGROUND

The design of a trailer in a tractor-trailer varies depending upon the region but regardless of the design, it is conventional to use a J-560 interface (commonly referred to as a 7-way coupler) on the trailer or other type of towable asset to ease the connection and disconnection of the trailer from the tractor. As implied by the name, a 7-way coupler includes 7 pins or terminals. One pin is for ground. The remaining six pins are conventionally used to drive the tail lights, marker lights, an auxiliary circuit such as an anti-lock brake (ABS) unit, the left turn signal, the right turn signal, and the stop lights, respectively.

The proper functioning of these various lights and circuits is vital for public safety. Various monitors have thus been developed that may wirelessly report the operating status of the lights and circuits in the trailer. But the ease of integration of such monitors is an issue. Similarly, various telematic reporting systems have been developed for the trucking industry. Customers may have thousands of rigs so the costs of retrofitting them to include monitors and telematics must be minimized.

SUMMARY

In accordance with an aspect of the disclosure, a trailer power system is provided that includes: a battery; a charger configured to charge the battery using a tractor power supply voltage; a detection circuit configured to detect whether the tractor power supply voltage is greater than a threshold value; a first switch coupled between a lead carrying the tractor power supply voltage and a trailer main power lead for powering an ABS controller in the trailer; a second switch coupled between the battery and the trailer main power lead; and a controller configured to control the first switch to couple the tractor power supply voltage to the trailer main power lead in response to a detection by the detection circuit that the tractor power supply voltage is greater than the threshold value, and wherein the controller is configured to respond to a first command to control the second switch to couple the battery to the trailer main power lead while the trailer is disconnected from a tractor.

In accordance with another aspect of the disclosure, a method of powering a trailer is provided that includes the acts of: while the trailer is connected to a tractor through a 7-way connection: routing a tractor power supply voltage through a housing including a first battery to power an ABS controller in the trailer in response to a detection that the tractor power supply voltage satisfies a threshold value; powering the ABS controller using the first battery in response to a detection that the tractor power supply voltage does not satisfy the threshold value; and while the trailer is disconnected from tractor and the 7-way connection: responding to a wireless command to couple the first battery to the ABS controller to power the ABS controller.

These and additional advantageous features of the disclosed embodiments may be better appreciated through a consideration of the following detailed description.

BRIEF DESCRIPTION OF THE DRAWINGS

Embodiments of the present disclosure and their advantages are best understood by referring to the detailed description that follows. It should be appreciated that like reference numerals are used to identify like elements illustrated in one or more of the figures.

DETAILED DESCRIPTION

Figure 1:
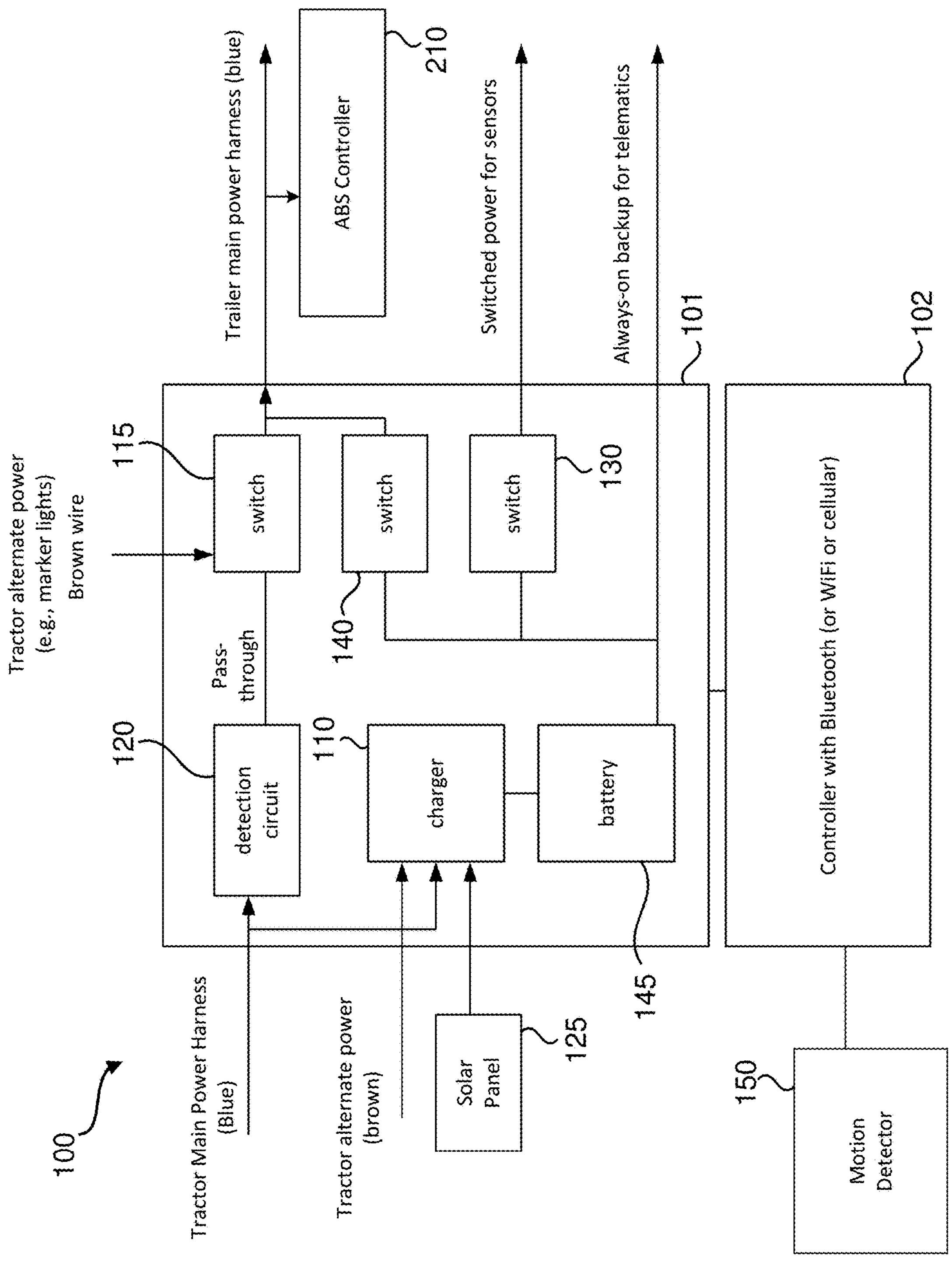
FIG. 1 is a block diagram of a smart battery box in accordance with an aspect of the disclosure.

To provide improved monitoring and telematics, a smart battery box is provided that provides always-on power for telematics and may selectively power the trailer main power harness to selectively power an anti-lock braking system (ABS) controller and also to selectively power sensors such as tire pressure monitoring system (TPMS) sensors, cameras, cargo sensors, and so on. The smart battery box may advantageously be used in conjunction with a smart nose box such as disclosed in U.S. patent application Ser. No. 17/890,895, (the '895 application) filed Aug. 8, 2022, the contents of which are incorporated by reference herein in their entirety. In such a smart nose box, a nose box housing encloses the telematics for tracking and monitoring the trailer and may also enclose a gateway or cellular transceiver. The nose box housing also encloses a battery for powering the telematics and the gateway through a power management system. However, it will be appreciated that the smart battery box disclosed herein may also be advantageously used in trailers having a nose box that lacks the advantageous features of the smart nose box disclosed in the '895 application.

The following discussion will use the term "trailer" generically to refer to a semi-trailer, a chassis, a flat bed, or any other suitable towable asset that may be towed by the tractor and receive the tractor's 7-way coupler. The smart nose box disclosed in the '895 application may also selectively power sensors while the trailer is detached from the tractor so that a user may continue to monitor the trailer status. Although the smart nose box disclosed in the '895 application advantageously solves many issues with regard to monitoring and managing a trailer, note that a user may be retrofitting an existing trailer with a smart nose box. To enable the selective powering of sensors by the smart nose box may then require a user to route an electrical connection from the smart nose box to the sensor that is to be selectively powered. It may be difficult or burdensome to install such an electrical connection.

Although a smart nose box may include a battery for powering the telematics and gateway, note that the current draw of the trailer harness for powering the ABS controller may well exceed the power rating of such a battery. In that regard, there is a distinction between circuits in the trailer that are powered by the trailer harness from other circuits such as the brake lights, turn signals, and marker lights of the trailer that are powered by corresponding dedicated leads in the 7-way connection to the tractor. For example, a trucker may perform a safety check before driving during which the trucker verifies that the brake lights, turn signals, and marker lights of the trailer are working as powered by the 7-way connection attached to the trailer from the tractor. But such a safety check does not verify that the trailer harness main power wire or lead (typically coloured as a blue wire) is operative. But the trailer harness provides power to the anti-lock brake controller and other circuits such as the automatic tire inflation system (ATIS). It is a common safety backup for the anti-lock brake controller to also be wired to the 7-way lead for the brake lights so that, should the main harness power be faulty or insufficient, the anti-lock brake system can still have power. But such a backup leaves other main-harness-powered circuits such as the ATIS without power. The battery box disclosed herein encloses a battery of sufficient power for powering the trailer main power harness should the tractor main power from the 7-way coupler from the tractor be faulty. In this fashion, the danger from the usual inability of a driver safety check to check the trailer main harness power is eliminated as the battery box will power the trailer main power harness in lieu of the tractor-provided power being insufficient or faulty.

A block diagram of an example battery box 100 is shown in FIG. 1. A battery system 101 receives the tractor main power harness from the 7-way connection to the tractor (should the tractor be coupled to the trailer including battery box 100). The trailer main power harness is also denoted herein as a lead for carrying the tractor power supply voltage. As noted earlier, the tractor main power harness is typically a blue wire. A charger 110 in the battery system 101 couples to the tractor main power harness so that a battery 105 may be charged by the charger 110 while the tractor power is available. Battery system 101 includes a detection circuit 120 (e.g., a voltage divider and a comparator) that measures a voltage (and optionally also a current) for the tractor main power harness. Should the detection circuit 120 verify that the tractor main power harness voltage satisfies a threshold value (e.g., 12 V), battery system 101 controls a first switch 115 so that the tractor main power harness is coupled to the trailer main power harness (the trailer main power harness is also denoted herein as a trailer main power lead and is also typically a blue wire). In this fashion, the ATIS and ABS controller in the trailer are powered by the tractor power as coupled through the tractor main power harness, switch 115, and the trailer main power harness.

As noted earlier, the visual safety check performed by a driver can typically only confirm the safe operation of the various lights on the trailer such as the brake lights, the marker lights, and the turn signals. The voltage on the tractor main harness may thus be faulty but not detected by the driver safety check. Detection circuit 120 detects such a faulty voltage such as by comparing the tractor main power harness voltage to a threshold value. To detect whether the trailer is in motion, battery box 100 may include a motion detector 150 such as an accelerometer or a vibration detector. Should the tractor main power harness voltage be less than the threshold as detected by the detection circuit 120 and the trailer be in motion as detected by the motion detector 150, battery system 101 controls a second switch 140 to couple the battery 105 to the trailer main power harness. In this fashion, safe operation of the trailer is maintained by battery box 100 despite the faulty tractor main power harness voltage (which may also be denoted as the tractor+power supply voltage). In some implementations, switches such as the first switch 115 and the second switch 140 may be combined into a single switch. For example, a single switch replacing switches 115 and 140 would select between the tractor main power harness and battery 105 to drive the trailer main harness. Should the tractor main power harness voltage satisfy the threshold, the tractor main power harness may be deemed to pass through the battery system 101 to couple to the trailer main power harness.

Battery system 101 may function to automatically control the first switch 115 to couple the tractor main power harness to the trailer main power harness whenever the trailer is coupled through the 7-way connector to the tractor and the tractor main power harness voltage satisfies the threshold. To provide additional control flexibility, battery system 101 may be controlled such as through a wirelessly commanded controller 102. For example, controller 102 may be configured to respond to Bluetooth commands, WiFi commands, cellular telephone commands, or any other suitable wireless protocol. Despite the trailer being disconnected from the tractor and thus not connected to the tractor's 7-way coupler, a user may then issue a Bluetooth command to force the second switch 140 to couple the trailer main power harness to the battery 105. Systems coupled to the trailer main power harness such as an ABS controller 210 or the ATIS may then be operated and tested despite the trailer being disconnected. Alternatively, controller 102 may have a cellular or WiFi connection to the user (or to the user's server). Regardless of how controller 102 is wirelessly coupled to the user, the user may then command the second switch 140 to couple the trailer main power harness to the battery 105. In this fashion, tests may be performed to verify proper operation of circuits connected to the tractor main power harness such as a test of the ABS controller 210 or a test of the ATIS.

In addition to powering the trailer main power harness, battery 105 may provide an always-on backup power to the trailer's telematics. As noted earlier, the telematics may be powered by its own battery such as contained within a smart nosebox. But battery box 100 provides a backup power to ensure uninterrupted operation of the telematics unit.

In addition to selectively powering the trailer main power harness despite the trailer being detached from the tractor, battery box 100 may also be used to selectively power additional sensors such as a TPMS sensor, cameras, cargo sensors, and so on. To do so, battery system 101 may include a third switch 130 that may selectively couple the battery 105 through a trailer lead to the desired sensor. A user may control the selective powering of a sensor through the third switch 130 through controller 103. Similarly, controller 103 may also control the on/off states of the first switch 115 and the second switch 140. Since the driver will typically verify proper operation of the marker lights before towing a trailer, battery box 100 may also advantageously use the marker light power to provide backup power to the main trailer harness. A power lead for the marker lights is typically a brown wire, which may be received by the first switch 115. Should the tractor main power be insufficient, the first switch 115 may thus be controlled to select for the marker lights power lead to power the trailer main harness. As also shown in FIG. 1, the charger may also couple to the power lead for the marker lights so that the battery 105 may be charged if the tractor main harness power voltage is insufficient.

Figure 2:
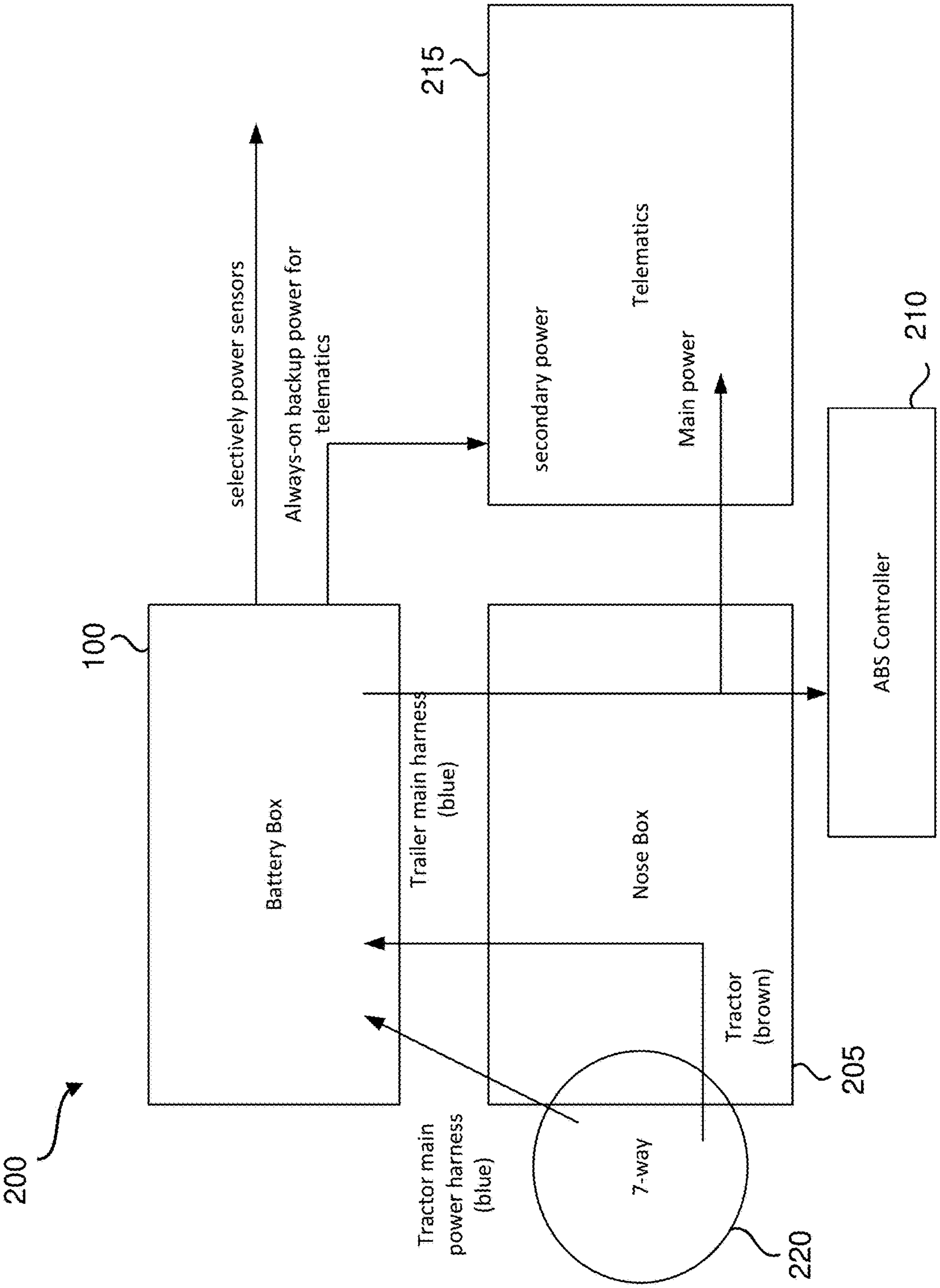
FIG. 2 is a block diagram of a trailer system including a smart battery box in which the trailer main harness routes from the smart battery box to the nose box before routing to the trailer in accordance with an aspect of the disclosure.

Battery box 100 may be advantageously integrated with a nose box 205 as shown in the trailer system 200 of FIG. 2. Nose box 205 includes a 7-way interface 220 for receiving the 7-way coupler or connection from the tractor. From the 7-way interface, the tractor main power harness routes to battery box 100 as discussed with respect to FIG. 1. Should battery box 100 be reasonably close to nose box 205 or should such a routing not present any retrofitting issues of the trailer, the trailer main power harness from battery box 100 may be routed back to nose box 205. In this fashion, nose box 205 may also monitor the trailer main power harness such as discussed for the smart nose box of the '895 application. Depending upon the voltage state of the tractor main power harness, battery box 100 may couple the tractor main power harness to the trailer main power harness or instead may power the trailer main power harness using the battery 105 (FIG. 1). The trailer main harness from nose box 205 may then power the ABS controller 210 and also power telematics 215. As discussed with regard to FIG. 1, battery box 100 may provide backup power to the telematics 215. In addition, battery box 100 may selectively power one or more sensors as also discussed with regard to FIG. 1. The power lead for the marker lights (the brown wire of the tractor main power harness) routes from nose box 205 to the battery box 100 to provide the backup power for the trailer main harness as discussed previously.

Figure 3:
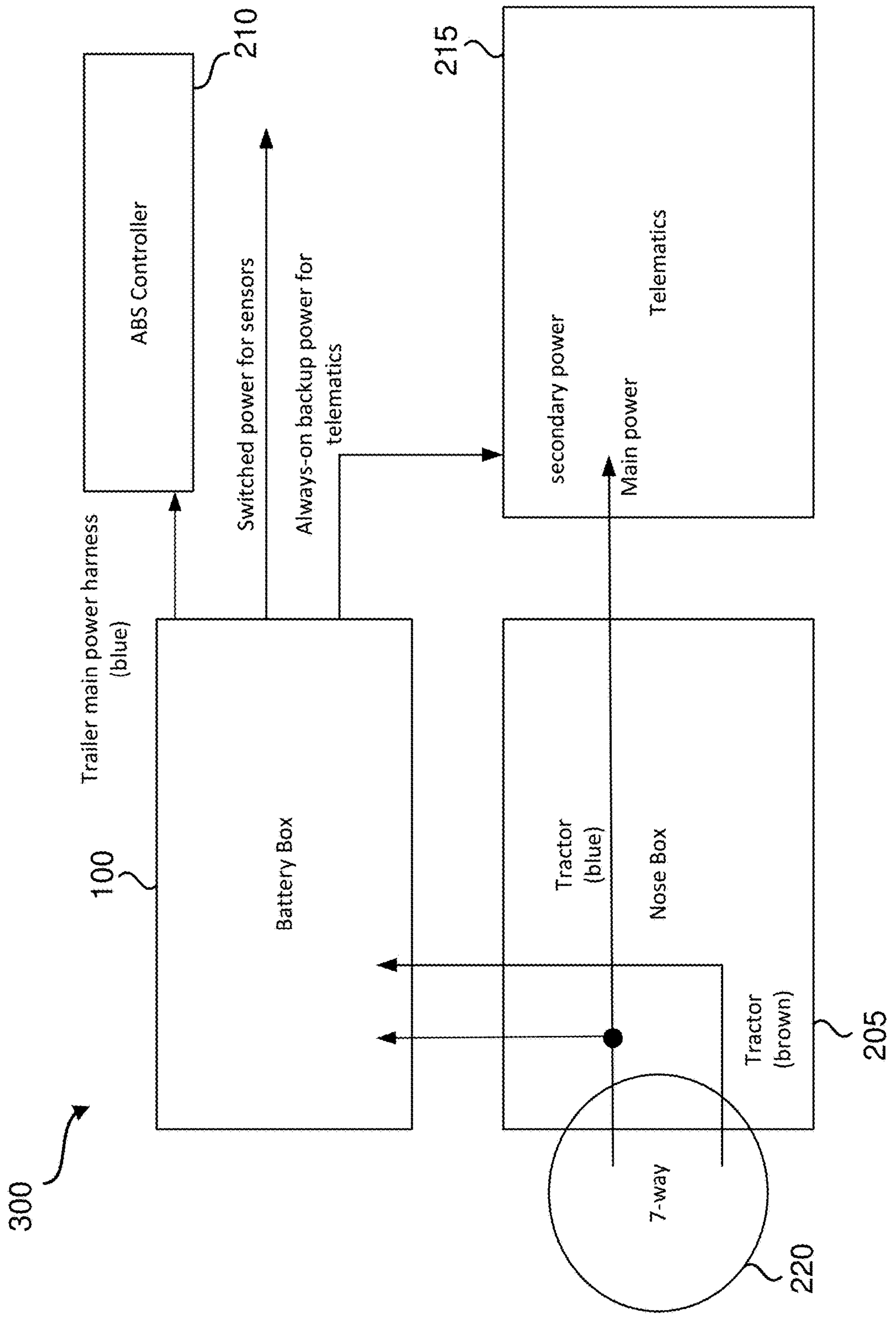
FIG. 3 is a block diagram of a trailer system including a smart battery box in which the trailer main harness routes directly from the smart battery box to the trailer in accordance with an aspect of the disclosure.

An alternative trailer system 300 is shown in FIG. 3. In trailer configuration 300, battery box 100 continues to couple through the 7-way interface 220 to the trailer main harness. Referring again to trailer system 200, note that there is a routing of the trailer main power harness from the battery box 100 to the nose box 205. To free the user from any difficulty in routing the trailer main power harness from the battery box 100 to the nose box 205, the trailer main power harness in the trailer system 300 routes directly from the battery box 100 to the trailer so as to power circuits such as the ABS controller 210. With regard to powering the ABS controller 210, note that as discussed earlier, battery box 100 may use the marker lights power lead (the brown wire) as a backup for powering the trailer main power harness should the tractor main power harness voltage be insufficient. The brown wire thus routes from the nose box 205 in trailer system 300 to the battery box 100. Referring again to FIG. 1, in this fashion the battery system 101 may power the ABS controller 210 using the marker light power for added safety and redundancy. The remainder of trailer system 300 is as discussed for trailer system 200.

Figure 4A:
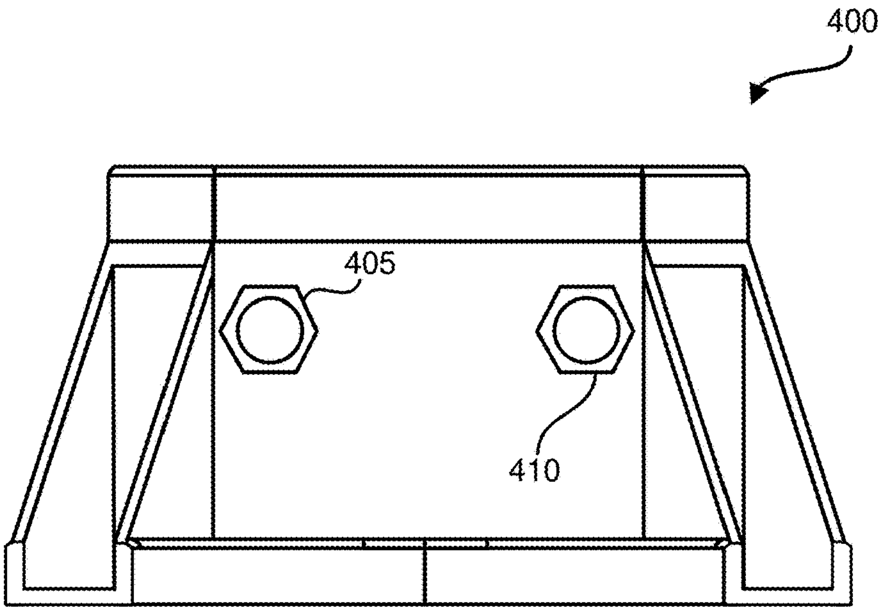
FIG. 4A is a side view of a housing for a smart battery box in accordance with an aspect of the disclosure.
Figure 4B:
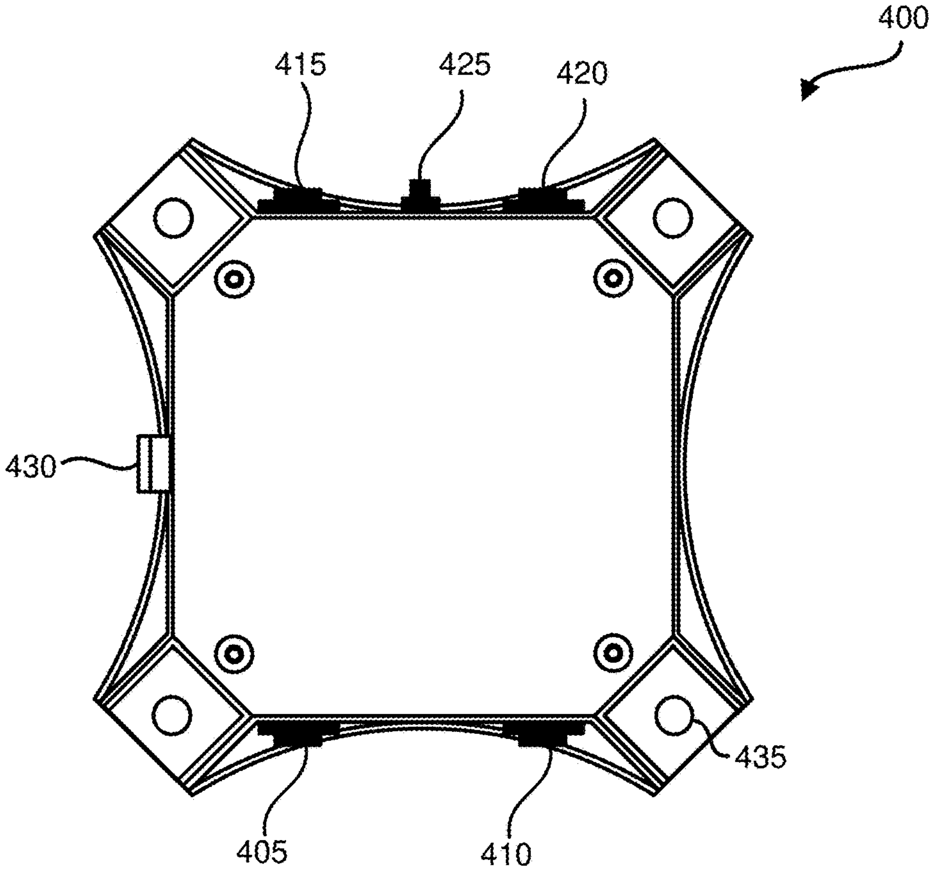
FIG. 4B is a plan view of the housing of FIG. 4A.

A housing 400 for a battery box as disclosed herein is shown in a side view in FIG. 4A and in a plan view in FIG. 4B. Housing 400 includes a port 410 for a lead from a solar panel 125 (illustrated in FIG. 1). In this fashion, charger 110 may charge the battery 105 should the trailer be positioned such that the solar panel 125 is sufficiently illuminated. Housing 400 also includes a port 405 for the tractor main power harness to receive power from the tractor. In addition, housing 400 also includes a port 415 for the trailer main power harness to power components such as the ABS controller and the ATIS. Housing 400 also includes a port 420 for the lead providing the telematics backup power and a port 425 for the lead providing the selectively activated sensor power. For safety, housing 400 also includes a gas vent 430 to vent any gases from the charging and discharging of the battery 105. To mount the housing to a suitable location on the trailer, housing 400 includes a plurality of bolt or fastener openings 435.

Figure 5:
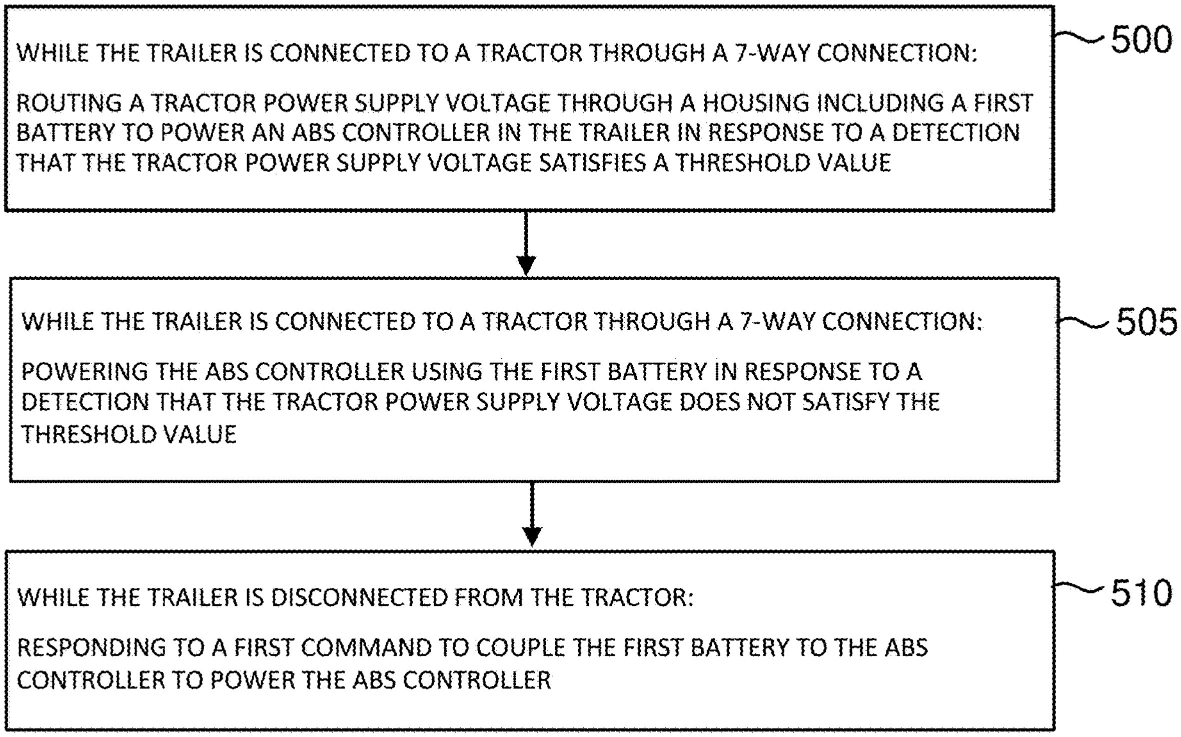
FIG. 5 is a flowchart of an example method of operation of a smart battery box in accordance with an aspect of the disclosure.

A method of powering a trailer using a smart battery box will now be discussed with reference to the flowchart of FIG. 5. The method includes an act 500 and an act 505 that both occur while the trailer is connected to a tractor through a 7-way connection. Act 500 includes routing a tractor power supply voltage through a housing including a first battery to power an ABS controller in the trailer in response to a detection that the tractor power supply voltage satisfies a threshold value. The routing through battery box 100 of FIGS. 2 and 3 is an example of act 500. Act 505 includes powering the ABS controller using the first battery in response to a detection that the tractor power supply voltage does not satisfy the threshold value. The powering of the ABS controller 210 in FIG. 1, 2, or 3 in response to a detection that the tractor power supply voltage does not satisfy the threshold is an example of act 505. Finally, the method includes an act 510 that occurs while the trailer is disconnected from the tractor and includes responding to a first command to couple the first battery to the ABS controller to power the ABS controller. The response of controller 102 of FIG. 1 to a command to power the ABS controller using battery 105 is an example of act 510.

As those of some skill in this art will by now appreciate and depending on the particular application at hand, many modifications, substitutions and variations can be made in and to the materials, apparatus, configurations and methods of use of the devices of the present disclosure without departing from the scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

We claim:

1. A trailer power system for a trailer, comprising:

a battery;

a charger configured to charge the battery using a tractor power supply voltage;

a detection circuit configured to detect whether the tractor power supply voltage is greater than a threshold value;

a first switch coupled between a lead carrying the tractor power supply voltage and a trailer main power lead for powering an ABS controller in the trailer;

a second switch coupled between the battery and the trailer main power lead; and a controller configured to control the first switch to couple the lead carrying the tractor power supply voltage to the trailer main power lead in response to a detection by the detection circuit that the tractor power supply voltage is greater than the threshold value, and wherein the controller is configured to respond to a first command to control the second switch to couple the battery to the trailer main power lead while the trailer is disconnected from a tractor.

2. The trailer power system of claim 1, further comprising:

a motion detector configured to detect whether the trailer is in motion, wherein the controller is further configured to control the second switch to couple the battery to the trailer main power lead in response to a detection that the tractor power supply voltage is less than the threshold value while the motion detector has detected that the trailer is in motion.

3. The trailer power system of claim 1, wherein the first switch and the second switch comprise a single switch configured to select between the battery and the lead carrying the tractor power supply voltage.

4. The trailer power system of claim 1, wherein the battery, the first switch, the second switch, the detection circuit, and the controller are all contained within a housing.

5. The trailer power system of claim 1, further comprising:

a third switch coupled between the battery and a trailer lead for a trailer sensor, wherein the controller is further configured to respond to a second command to control the third switch to couple the battery to the trailer lead to power the trailer sensor while the trailer is disconnected from the tractor.

6. The trailer power system of claim 4, further comprising:

a nose box including a 7-way interface for coupling to a 7-way connector from the tractor, wherein the trailer main power lead is routed from the housing to the nose box and routed from the nose box to the ABS controller.

7. The trailer power system of claim 4, further comprising:

a nose box including a 7-way interface for coupling to a 7-way connector from the tractor, wherein the trailer main power lead is routed from the housing directly to the ABS controller.

8. The trailer power system of claim 1, wherein the controller is further configured to respond to a third command to control the second switch to couple the battery to the trailer main power lead so that a test may be performed on an automatic tire inflation system (ATIS) coupled to the trailer main power lead.

9. The trailer power system of claim 5, wherein the trailer sensor comprises a tire pressure monitoring system (TPMS) sensor.

10. The trailer power system of claim 6, wherein the nose box contains a telematics unit for the trailer, and wherein the battery is configured to provide a backup power to the telematics unit.

11. The trailer power system of claim 5, wherein the trailer sensor comprises a cargo sensor.

12. The trailer power system of claim 5, wherein the trailer sensor comprises a camera.

13. The trailer system of claim 1, wherein the controller is configured to respond to wireless commands, and wherein the first command is a wireless command.

14. The trailer power system of claim 13, wherein the controller is configured to respond to Bluetooth wireless commands.

15. The power trailer system of claim 13, wherein the controller is configured to respond to WiFi wireless commands.

16. The trailer power system of claim 13, wherein the controller is configured to respond to cellular wireless commands.

17. A method of powering a trailer, comprising:

while the trailer is connected to a tractor through a 7-way connection:

routing a tractor power supply voltage through a housing including a first battery to power an ABS controller in the trailer in response to a detection that the tractor power supply voltage satisfies a threshold value;

powering the ABS controller using the first battery in response to a detection that the tractor power supply voltage does not satisfy the threshold value; and while the trailer is disconnected from the tractor and the 7-way connection:

responding to a first command to couple the first battery to the ABS controller to power the ABS controller.

18. The method of claim 17, further comprising:

while the trailer is disconnected from the tractor and the 7-way connection:

responding to a second command to couple the first battery to a sensor in the trailer.

19. The method of claim 18, wherein the sensor is a TPMS sensor.

20. The method of claim 17, further comprising:

powering a telematics unit in the trailer using a second battery during a normal operation of the second battery; and powering the telematics unit using the first battery in response to a fault condition of the second battery.

* * * * *